W. J. COCHRAN.
Car-Wheel.

No. 159,644

Patented Feb. 9, 1875.

Attest:
A. H. Norris
Jno. L. Coombs

Inventor.
William J. Cochran
By his attorney
James L. Norris.

UNITED STATES PATENT OFFICE.

WILLIAM J. COCHRAN, OF BALTIMORE, MARYLAND.

IMPROVEMENT IN CAR-WHEELS.

Specification forming part of Letters Patent No. 159,644, dated February 9, 1875; application filed January 9, 1875.

*To all whom it may concern:*

Be it known that I, WILLIAM J. COCHRAN, of Baltimore, in the county of Baltimore and State of Maryland, have invented certain new and useful Improvements in Car-Wheels, of which the following is a specification:

This invention relates to certain improvements in the construction of car-wheels, and is especially designed for street-railroad cars and other vehicles to be used upon tracks having short curves, the object being to secure a light and durable wheel that will automatically lubricate the axle upon which it revolves, each wheel turning or revolving independently of the others to facilitate the turning of such curves, as will be fully hereinafter described.

The invention consists of a wheel having the hub portion projecting on both sides and made hollow, or having an annular chamber surrounding the central aperture, through which the axle passes, said chamber containing lubricating material, and communicating with the central aperture by means of a suitable passage, in order to supply the lubricating material to the axle automatically in proper quantities, in combination with a chilled bushing.

Where the wheel is constructed with a web instead of spokes the annular chamber may extend into the web any desired distance, but in case the wheel is constructed with spokes the said chamber is formed in the hub, which is enlarged for the purpose. In the latter case, if desirable, the hub may be constructed, and a chilled bushing, through which the axle passes, may be properly secured therein, said bushing being provided with apertures to supply the lubricant to the axle, as before described. The annular chamber is provided with an aperture for the purpose of supplying it with lubricating material, and, in some instances, with a "hand-hole" for the purpose of inserting fibrous or other suitable material to distribute the lubricant. The wheel is set upon a short axle, properly fastened to suitably-chilled blocks, secured in standards attached to the sides of the car. The entire hub, or the end of the same which revolves in contact with the axle-blocks, is chilled to prevent wear by frictional contact with the same.

Figure 2:
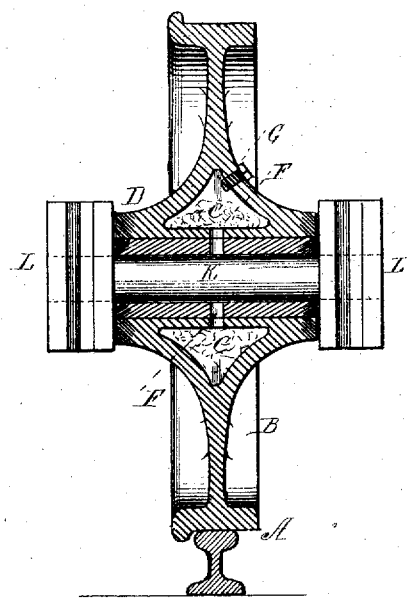
Figure 3:
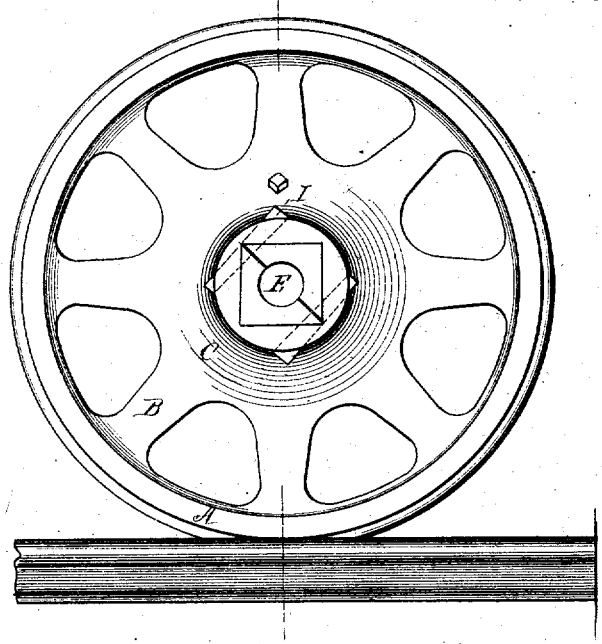
Figure 1:
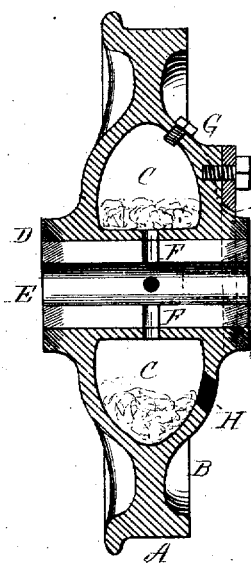
Figure 5:
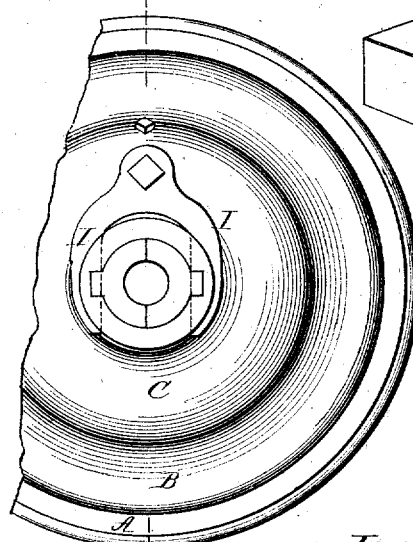
Figure 4:
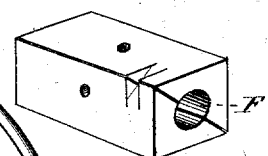

In the drawings, Figure 1 represents a sectional view of a wheel constructed according to my invention, with the usual web. Fig. 2 represents a sectional view of the same when constructed with spokes. Fig. 3 represents an elevation of a wheel, showing the chilled boss employed in combination with the hollow hub. Fig. 4 represents a detached view of the chilled boss, and Fig. 5 represents the axle secured to the chilled axle-blocks.

The letter A represents the wheel, and B the web or spokes. C represents the annular chamber, and D D the projecting portions of the hub or chilled boss set in the hub. E represents the central opening through the hub or boss for the reception of the axle. The projecting ends of the hub, or the entire hub portion or boss, are chilled or hardened in any convenient manner to prevent wear, or they may be constructed of anti-friction metal for the same purpose. F F represent the apertures for supplying the lubricant to the axle; G, the aperture for filling the annular chamber; and H the hand-hole for inserting the fibrous filling, when desirable, to distribute the oil. When the boss is used the hub is formed hollow with suitable openings for the insertion of the same. The said boss is most conveniently constructed square in section, and is confined in the hub by means of pins I I inserted through the hub and the corners of the boss. The axle is represented in Fig. 5 by the letter K, and is immovably secured to the axle-blocks L L in any convenient manner. The said blocks are provided with V-shaped grooves which fit into corresponding grooves in the standards of the car, and secure said blocks therein, and their surfaces are chilled or hardened to prevent wear in the same manner as the wearing portions of the wheel and axle. The rim of the wheel is formed with a tread and flange, as usual, which may be chilled, if desired.

The wheels as thus constructed, owing to the hollow web or hub, can be made extremely light at no sacrifice of strength, the hollow web or hub serving the additional purpose of holding and supplying the lubricant to the wheel and axle in proper quantities.

The centrifugal action of the wheel, when the car is in motion, will throw the oil to the extreme edges of the annular chamber, thus distributing it uniformly throughout the same, and preventing it from running out upon the axle and wasting while the wheel is in motion, permitting, sufficient, however, at each stoppage to reach the axle to thoroughly lubricate the same.

Having thus described my invention, what I claim as new, and desire to secure by Letters Patent, is—

A car-wheel having the chilled bearing-bosses D D projecting from each side, oil-cavity C, and perforation, in combination with the chilled bushing F, substantially as and for the purpose described.

In testimony that I claim the foregoing I have hereunto set my hand.

WM. J. COCHRAN.

Witnesses:
    ALBERT H. NORRIS,
    GEO. W. CUSHING, Jr.